No. 761,128. PATENTED MAY 31, 1904.
P. C. ARNOLD.
BELL.
APPLICATION FILED JAN. 21, 1901.
NO MODEL.
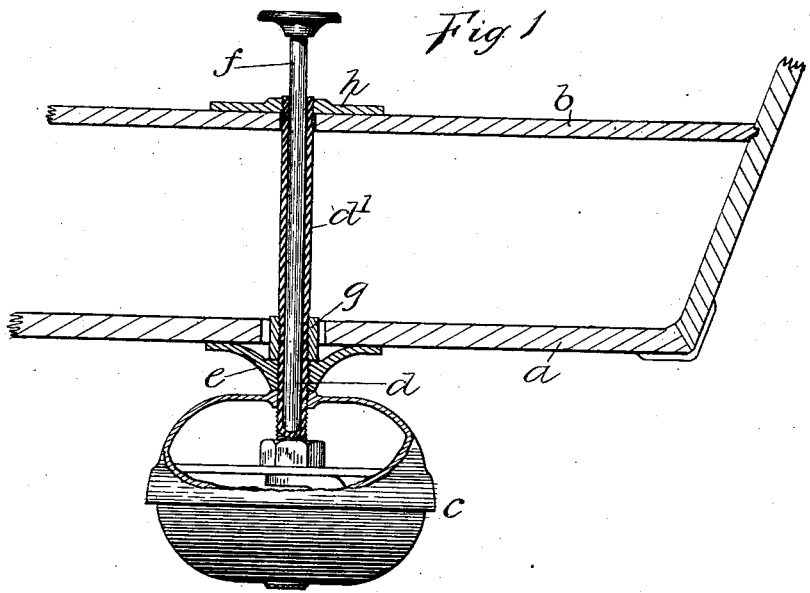
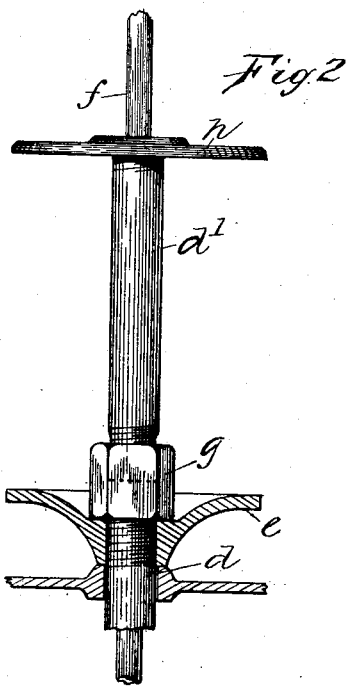
Witnesses
Arthur B. Jenkins,
Emma T. Coffrin.
Inventor
Philip C. Arnold,
by Chas. L. Burdett
Attorney No. 761,128.   Patented May 31, 1904.

UNITED STATES PATENT OFFICE.

PHILIP C. ARNOLD, OF EAST HAMPTON, CONNECTICUT, ASSIGNOR TO THE BEVIN BROTHERS MANUFACTURING COMPANY, OF EAST HAMPTON, CONNECTICUT, A CORPORATION OF CONNECTICUT.

BELL.

SPECIFICATION forming part of Letters Patent No. 761,128, dated May 31, 1904.

Application filed January 21, 1901. Serial No. 44,023. (No model.)

*To all whom it may concern:*

Be it known that I, PHILIP C. ARNOLD, a citizen of the United States, and a resident of East Hampton, in the county of Middlesex and State of Connecticut, have invented certain new and useful Improvements in Bells, of which the following is a description.

My invention relates more especially to the class of bells used for sounding an alarm; and the object of my invention is to provide a simple, practical, and durable means for attachment of the bell to a vehicle or the like.

One form of device by means of which the objects may be attained is illustrated in the accompanying drawings, in which—

Figure 1 is a view in section through the floor of a vehicle and in side view, with parts broken away, of the shell or gongs of a bell attached thereto. Fig. 2 is a view in elevation, on an enlarged scale, partly in section, of my improved attaching means.

A common form of construction of the bodies of motor-vehicles embodies a lower or main floor $a$ and an upper floor or footboard $b$, the alarm-bell $c$ being secured to the under surface of the main floor. In such a construction of parts a comparatively long plunger for operating the bell is required, and in order that the plunger shall operate without cramping it has been found necessary to provide a long bearing for the plunger and also construct the parts so that the bell may be readily secured in position or removed from the vehicle without interfering with the other parts occupying most of the available space underneath the vehicle-body.

In order to avoid the objections above noted, the central post $d$ of the gong is made of sufficient length to extend for a distance beyond the base $e$, and this post or sleeve forms a comparatively long bearing for the spindle or plunger $f$. The end $d'$ of this post or sleeve is of sufficient length to extend through the floor or floors of the vehicle, and in addition to the long bearing afforded for the spindle it also provides a guide, so that the spindle or plunger may be readily inserted in proper position without difficulty, as would be the case in a construction having a hole in the main floor into which the end of the spindle must be inserted from above. In the preferred form of construction and as shown in the drawings herein the sleeve or post is made in sections, the section $d$ extending from within the shell to a short distance outside of the base $e$ and the section $d'$ of the sleeve extending through the two floors of the vehicle. A coupling $g$ fits the adjacent threaded ends of the two sections to unite them. A plate $h$ is secured to the outer end of the section $d'$. This plate is preferably secured to the sleeve by means of interengaging screw-threaded parts, the base $e$ being also preferably secured in place in like manner. The bell is thus firmly secured in place by means of the base and plate which exert a clamping action on the floor of the vehicle, and the use of screws is thus avoided.

What I claim as my invention, and desire to secure by Letters Patent, is—

1. In an alarm-bell, in combination with a gong, a sleeve extending within the gong and forming a support therefor, a gong-base adjustably arranged upon the sleeve, a nut coöperating with the base to lock the sleeve, gong-base and gong in position, a face-plate secured to the outer end of the sleeve and with its surface flush with the end thereof when in place, said sleeve providing an unbroken tube with a continuous smooth inner surface from end to end and a removable plunger arranged to slide within the tube and actuate the sounding mechanism of the gong, and sounding mechanism for the gong.

2. In combination with a gong, striking mechanism therefor, a base for the gong, a screw-threaded sleeve securing the gong and base, an elongated nut arranged to hold the base, screw-threaded sleeve and gong in locked position with reference to each other, a tube extending within the nut and registering as to its inner surface with the screw-threaded sleeve of the gong, said tube and sleeve forming a continuous, unbroken passage to the striking mechanism, and a removable rod arranged to slide in said tube and screw-threaded sleeve for actuating said striking mechanism.

3. In an alarm-bell, in combination with a gong, bell-sounding mechanism located within the gong, a sectional sleeve extending from the gong and having a smooth continuous inner surface extending from end to end of the sleeve, a base located on the sleeve, a coupling located adjacent to the base and uniting the sections of the sleeve, a face-plate secured to the opposite end of said sleeve, and a plunger of uniform diameter removably located in the sleeve to operate the bell-sounding mechanism.

4. In an alarm-bell, in combination with a gong, a sleeve extending within the gong and forming a support therefor, a base adjustably arranged upon the sleeve, said gong and base fitting a screw-threaded surface on said sleeve, a tube abutting against the end of the sleeve and forming, when the parts are in position, an unbroken tube with a continuous smooth inner surface, and a coupling appurtenant to one of said tubes and joining it to the other, and said coupling adapted to clamp the gong, base and tubes in fixed position.

5. In combination with a gong, a striking mechanism therefor, a base for the gong, a screw-threaded sleeve securing the gong and base and forming an opening into the gong, an elongated nut arranged to hold the base, screw-threaded sleeve and gong in locked position with reference to each other, a tube appurtenant to the elongated nut and forming a smooth unbroken continuation of the opening into the gong, and a removable rod arranged to slide in said tube and screw-threaded sleeve for actuating said striking mechanism.

PHILIP C. ARNOLD.

Witnesses:
A. AVERY BEVIN,
MAYO S. PURPLE.